June 8, 1965 H. W. WESSELLS III 3,188,110
SPRING MOUNTING STRUCTURE FOR AN AUTOMOBILE UNDERFRAME
Filed Dec. 26, 1963
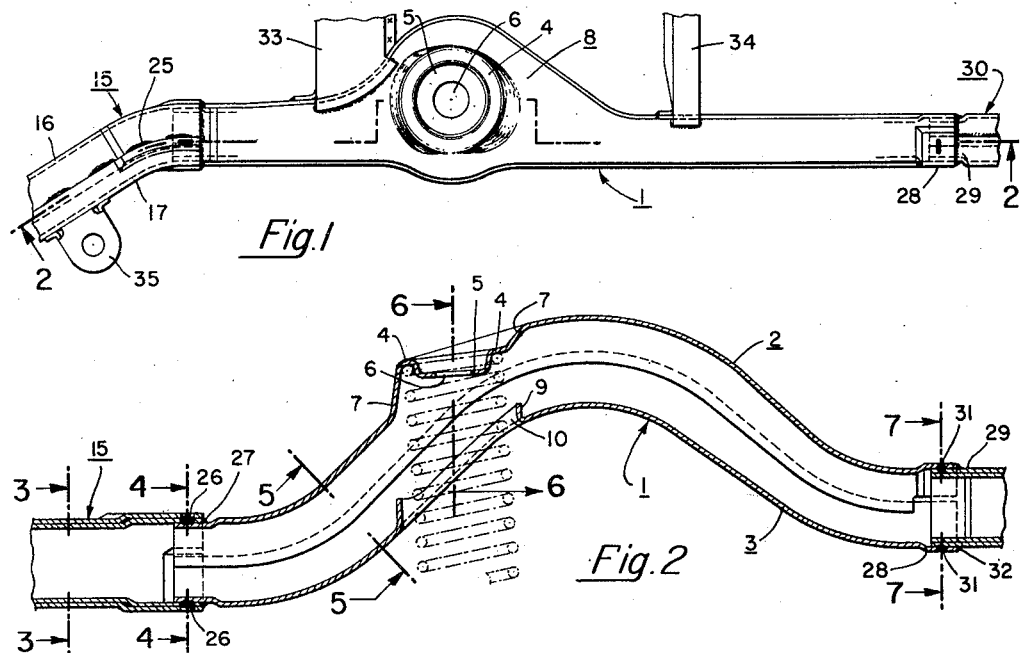
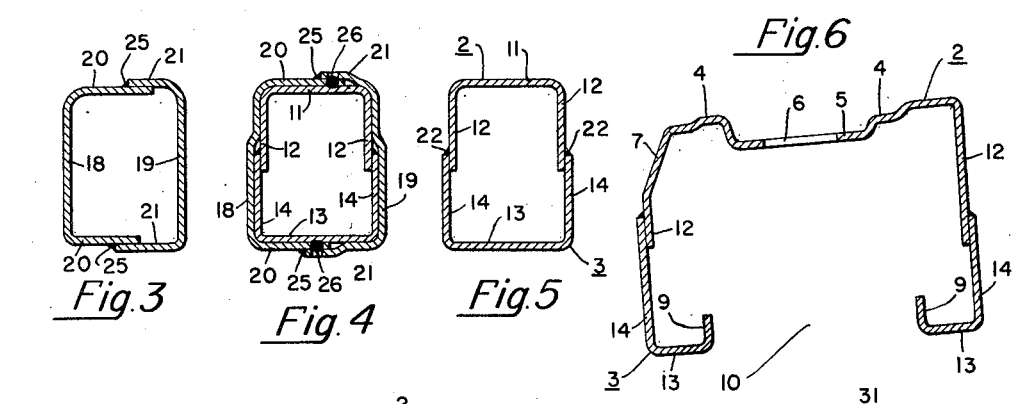
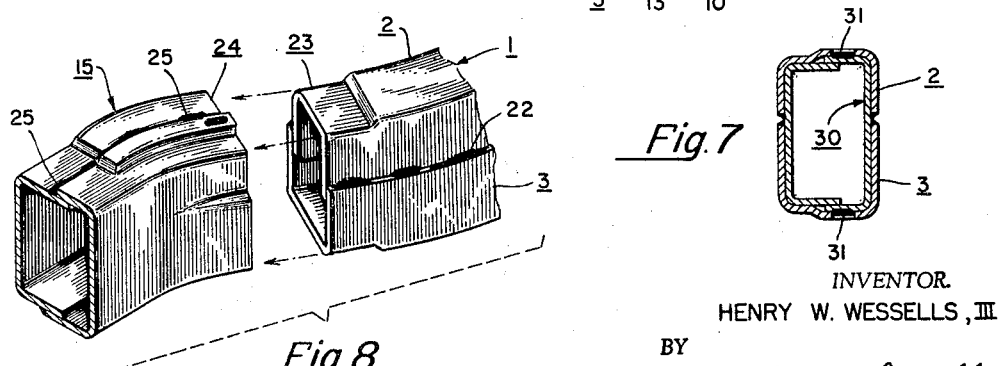
INVENTOR.
HENRY W. WESSELLS, III
BY John B. Sowell
ATTORNEY

United States Patent Office 3,188,110
Patented June 8, 1965

3,188,110
SPRING MOUNTING STRUCTURE FOR AN
AUTOMOBILE UNDERFRAME
Henry W. Wessells III, Paoli, Pa., assignor to The Budd Company, Philadelphia, Pa., a corporation of Pennsylvania
Filed Dec. 26, 1963, Ser. No. 333,415
6 Claims. (Cl. 280—106)

This invention concerns an automobile underframe and more particularly the spring mounting structure at the rear axle kick-up.

Automobiles employing coil springs at the rear wheels are supporting the rear end of the automobile body by compressing the coil spring between the rear axle and the frame. A shock load imposed on these coil springs is very large and is magnified to some extent by the movement of the automobile-body-frame as well as the axle.

Several different structures have been heretofore employed to provide a coil spring housing seat on the frame. The most commonly used structure is a fabricated auxiliary plate welded to the inside of each of the frame side members at a point over the axle, these plates of necessity being reinforced with side gussets and usually interconnected by a cross member or transom bar.

Heretofore, it was common to weld on auxiliary structures to the inboard side of the frame to provide a seat for the coil spring. Former attempts to provide a spring seat integral with the frame structure have so weakened the frame at its point of maximum stress that they have not been acceptable structures or must be heavily reinforced to be acceptable.

It is desirable from the standpoint of economy of manufacture to simplify a fabricated structure, and it is desirable from the standpoint of strength to reduce stress concentration to a minimum, particularly at areas where deflections are maximum.

It is therefore a general object of the present invention to provide a novel spring-seat-frame structure.

It is a further object of the present invention to provide an improved two-piece frame kick-up with an integral spring housing.

It is another object of the invention to provide an improved frame kick-up structure.

Other objects and advantages and the manner in which they are obtained will become evident from the following description when read in connection with the drawings forming a part of this specification.

FIG. 1 is a plan view of the left rear frame side member at the kick-up over the axle.

FIG. 2 is an elevation in section of the frame taken at lines 2—2 of FIG. 1.

FIG. 3 is an end elevation in section of the front frame side member taken at lines 3—3 of FIG. 2.

FIG. 4 is an end elevation in section of the joint connection between the frame kick-up and the front frame side member taken at lines 4—4 of FIG. 2.

FIG. 5 is a section in elevation taken through the frame kick-up at lines 5—5 of FIG. 2.

FIG. 6 is a section in elevation taken through the spring seat structure at lines 6—6 of FIG. 2.

FIG. 7 is a section in elevation taken through the joint connection between the frame kick-up and rear frame side member.

FIG. 8 is a perspective of the joint connection between the front frame side member and the frame kick-up.

Referring now to FIGS. 1 and 2, the frame kick-up 1 comprises an upper frame member 2 and a lower frame member 3. The upper frame member 2 is provided with a spring seat portion 4 radially outward from a recess or deep drawn portion 5 forming a shock absorber seat and having an aperture blanked therein and radially expanded when the spring seat portion 4 is formed. In FIG. 2, the formed portion radially outward from the spring seat portion 4 is formed downward to the front and upward to the rear providing a plurality of annular rings or flanges in the spring seat area 8. The lower frame member 3 is formed with a turned-up ring or flange 9 as a continuous part of the lower frame member, leaving a lower aperture 10 for the coil spring.

As shown in FIGS. 4 to 8, the upper frame member 12 is channel-shaped having a horizontal base web 11 and vertical end webs 12. Lower frame member 3 is channel-shaped having a horizontal base web 13 and vertical end webs 14. The front frame side member 15 comprises inner and outer channel members 16 and 17 having vertical base webs 18 and 19 and end webs 20 and 21.

Front frame side member 15, as shown in FIG. 3, has the end webs overlapped and welded to provide a double thickness of metal in the horizontal webs thus presenting a high horizontal axis moment of inertia cross section which resists vertical bending and deflections.

The frame kick-up member 1, as shown in FIG. 5, has vertical end webs 12 and 14 with little overlap leaving the weld 22 near the horizontal neutral axis. The forward end of the frame kick-up is swaged down to form an inner seat 23 for insertion into the opening 24 provided in the front frame side member 15 which is expanded outwardly to fit over the end of the frame kick-up 1. The welds 22 on the end webs of the kick-up may be made continuous or discontinuous for they are at the neutral axis of the beam in bending. Arc deposited welds of this type usually have poor bending and elongation characteristics, but have been found to provide superior attachment strength when placed at the neutral axis. Welds 25 on the horizontal end webs are farthest removed from the horizontal neutral axis and are preferably made discontinuous to avoid stress concentrations in the brittle welds. Plug welds 26 are provided between the end webs 20 and 21 at the end of opening 24 and base webs 11 and 13 as safety welds to augment the weld connection 27 joining the members 1 and 15.

In similar manner, the rearward end of frame kick-up member 1 is provided with an opening 28 which fits over a seat 29 on rear frame side member 30, joined thereto by plug welds 31 and a weld connection 32.

Rear suspension cross member 33 connects opposite side members of the frame, not shown, and is joined to the kick-up forward of the spring-seat area at a peripheral edge thereof. Cross member 34 also connects the opposite side members and is joined to the kick-up to the rear of the spring-seat area. While the cross members 33 and 34 are provided for connection of suspension parts, shock absorber and transverse stabilizers, they tend to rigidify the underframe and transmit transverse loads between opposite side members.

In actual operation, the rear wheels transmit the most severe force to the underframe when a rear wheel drops into a pot hole. It is common practice to test underframes for passenger vehicles by simulating this condition. This upward force here is considered to be axially aligned with the coil spring.

If a suddent force is transmitted upward into spring-seat area 8 the kick-up is loaded like a beam supported by its ends at forward body mounting bracket 35 and rear body mounting brackets, not shown. Since the seat area 8 is of greater diameter than the coil spring seat portion 4 the stresses are initially distributed into the adjoining enlarged area of the same piece of metal. Bending forces in upper frame member 2 are greatest in the seat area 8 where the base web 11 is of largest cross-sectional area. Similarly, the greatest bending forces in lower frame member 3 are at base web 13 surrounding the lower aperture and in ring or flange 9. Shear forces acting on the beam are greatest at the mounting points and at the spring-seat area. Thus, the areas or points that incur the greatest stresses are smooth continuous members free from welds and discontinuities that would induce stress concentrations. Each of the apertures 6 and 10 is formed with reinforcing structures surrounding them which uniformly distribute the loads in the steel frame members.

Not only is the present structure economical to manufacture, but it is free from welded-on plates and seats that cause stress concentrations. However, the novel two-piece kick-up structure may be made by fabrication of several parts and welding them together or by adding additional pieces thereto.

While a single embodiment of the novel frame kick-up structure has been shown by way of illustration it is to be understood that modifications of the spring-seat area of the underframe may be made without departing from the present invention which is only limited by the appended claims.

What is claimed is:

1. A spring-seat housing structure for an automobile beam underframe kick-up comprising:
   an upper kick-up frame member having a channel-shaped cross-section, said member comprising
   an arcuate concave horizontal base web,
   vertical end webs connected to said base web and extending downward therefrom,
   a deep drawn recessed spring seat formed in said horizontal web, and a spring-seat area adjacent said spring seat providing a greater base web width than the base web width longitudinally removed from said spring-seat area,
   a lower kick-up frame member having a channel-shaped cross-section, said member comprising
   an arcuate convex horizontal base web,
   vertical end webs connected to said base web and extending upward therefrom,
   an aperture in said convex base web, and
   a flanged annular ring formed in said convex base web surrounding said aperture,
   and arc welds connecting the vertical ends webs of said members to form a rectangular beam frame kick-up.

2. A spring-seat housing structure as defined in claim 1 wherein said rectangular beam is provided with swaged ends adapted to overlap and interconnect with front and rear side members.

3. A spring-seat housing structure for an automobile underframe kick-up comprising,
   an upper kick-up frame member having arcuate and concave shaped web members and downward extending end webs,
   a spring-seat area in said upper kick-up frame member of greater cross-section area than the remainder of said upper kick-up frame member,
   a plurality of annular rings formed in said spring-seat area providing a spring seat,
   a lower kick-up frame member having arcuate and convex shaped web members and upward extending end webs,
   a spring aperture area in said lower kick-up frame member of greater cross-sectional area than the ends of said lower kick-up frame member, having
   an annular flange surrounding an aperture in said spring aperture area, said annular flange being spaced opposite said spring-seat area,
   and welds connecting said downward extending end webs to said upward extending end webs providing a two-piece underframe kick-up with an integrally formed spring-seat housing therein.

4. A spring-seat housing structure according to claim 3 wherein there is further provided a shock absorber mounting area concentric with and radially inwardly from said spring-seat in said spring-seat area.

5. A spring-seat housing structure according to claim 4 wherein there is further provided a rear suspension cross-member welded to said spring-seat area forward of said spring seat and at a peripheral area thereof providing torsional stability to said kick-up frame members.

6. A spring-seat housing structure according to claim 5 wherein there is further provided a stabilizing cross member rearward of said spring-seat area and welded to said kick-up member remote therefrom.

References Cited by the Examiner
UNITED STATES PATENTS 2,389,907  11/45  Helmuth _____ 296—28

FOREIGN PATENTS 490,831  2/53  Canada.
752,036  7/56  Great Britain.

MILTON BUCHLER, *Primary Examiner.*